United States Patent [19]

Sawamura et al.

[11] Patent Number: 5,665,936
[45] Date of Patent: Sep. 9, 1997

[54] WIRE SPACING DEVICE

[75] Inventors: Naohito Sawamura; Yoshihiro Kumazawa, both of Yokkaichi, Japan

[73] Assignee: Sumitomo Wiring Systems, Ltd., Yokkaichi, Japan

[21] Appl. No.: 322,360

[22] Filed: Oct. 13, 1994

Related U.S. Application Data

[62] Division of Ser. No. 981,257, Nov. 25, 1992, abandoned.

[30] Foreign Application Priority Data

Nov. 25, 1991 [JP] Japan ................... 3-096489 U
Nov. 27, 1991 [JP] Japan ................... 3-097449 U

[51] Int. Cl.[6] .............................................. H05K 9/00
[52] U.S. Cl. ........................... 174/32; 174/99 R; 174/27
[58] Field of Search .............................. 174/99 R, 68.3, 174/138 E, 146, 97, 27, 32, 34, 72 A, 101

[56] References Cited

U.S. PATENT DOCUMENTS

| | | | |
|---|---|---|---|
| 2,008,109 | 7/1935 | Reher | 174/129 R |
| 2,141,894 | 12/1938 | Alexanderson | 174/99 R X |
| 3,043,902 | 7/1962 | Klein | 174/146 |
| 3,198,508 | 8/1965 | Melton et al. | 174/146 X |
| 3,342,168 | 9/1967 | Burdette | 174/146 X |
| 3,463,870 | 8/1969 | Eucker | 174/146 X |
| 3,530,634 | 9/1970 | Adams | 174/146 X |

FOREIGN PATENT DOCUMENTS

| | | | |
|---|---|---|---|
| 0730379 | 8/1942 | France | 174/68.3 |
| 63-28213 | 2/1988 | Japan . | |
| 0019761 | 11/1901 | United Kingdom | 174/99 R |
| 796532 | 6/1958 | United Kingdom . | |
| 1032667 | 6/1966 | United Kingdom . | |
| 1354321 | 5/1974 | United Kingdom . | |
| 1391363 | 4/1975 | United Kingdom . | |
| 1462870 | 1/1977 | United Kingdom . | |
| 2070344 | 9/1981 | United Kingdom . | |
| 2136637 | 9/1984 | United Kingdom . | |
| WO8707755 | 12/1987 | WIPO . | |

*Primary Examiner*—Hyung S. Sough
*Attorney, Agent, or Firm*—Sughrue, Mion, Zinn, Macpeak & Seas

[57] ABSTRACT

A wire spacing device for protecting a signal line from the interference of a strong electromagnetic field from a power line by keeping the signal line separate from the power line by a predetermined distance includes a center bar extending in first and second hooks provided on each end of the center bar. Each of the first and second hooks is formed by an elastic material in a C-shape configuration having a gap smaller than the diameter of any of the first and second wires. When either one of the first and second wires is pressed in the gap, the hook resiliently opens the gap and passes the wire therein, and then the hook resiliently returns to the original position to hold the passed wire therein.

3 Claims, 9 Drawing Sheets

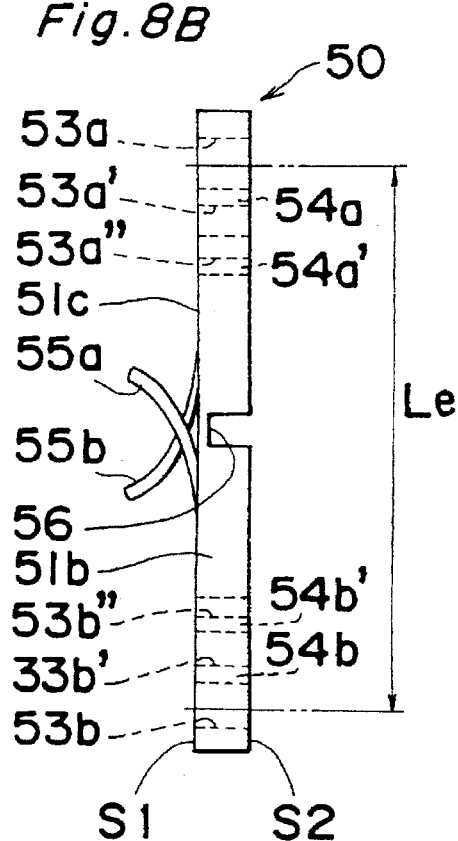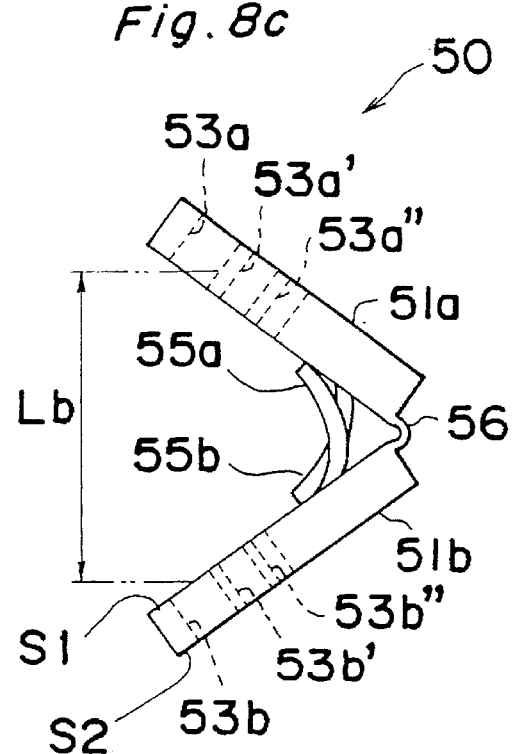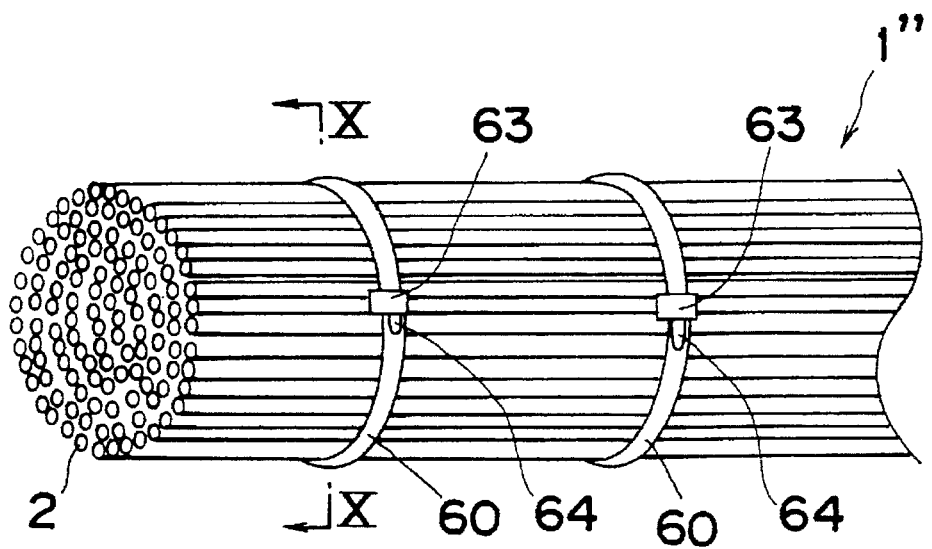

WIRE SPACING DEVICE

This is a Divisional of application Ser. No. 07/981,257 filed Nov. 25, 1992, now abandoned.

BACKGROUND OF THE INVENTION

1. Field of the Invention

The present invention relates to a wire spacing device which protectively keeps two wires of a wire harness at a predetermined distance, and is particularly suited for protecting electric wires from interference signals, such as electromagnetic waves.

2. Description of the Prior Art

In FIG. 19, a conventional wire harness 101 constructed in such a manner such that a plurality of electric wires 102 are bundled and then are wrapped therearound by a tape 103 as shown. Since the electric wires 102 are bundled together by wrapping, a distance between any two wires 102 easily varies during or after installation of the wire harness 101 in equipment. Therefore, even if a specific pair of wires 102 are separated at a certain distance before wrapping the tape 103 to construct the wire harness 101, they may come close to each other after the installation.

When a high power line is passing adjacent to a signal line, the electromagnetic field generated by the high power line tends to interfere with the signal line's reception of desired signals. For example, a signal line such as a speaker line 104 for connecting the speaker (not shown) and the amplifier (not shown) should be held away from the power line 105 to prevent the speaker line from receiving the strong electromagnetic field generated by the power line 105. When the speaker line receives the electromagnetic field of the power line 105, noise signals will be added to the speaker lines 104, resulting in a degradation of sound produced by the speaker.

Since these two lines 104 and 105 may come close to each other, as described above, in the conventional wire harness 101, one way to avoid the electromagnetic interference is to shield the signal line, but results in high manufacturing cost.

In FIG. 20, the conventional wire harness 101 accommodated in a protection box 201 for protecting the wire harness 101 from the external effect is shown. The protection box 201 is closed by a lid 204 with the wire harness 101 accommodated therein and is located, e.g., on the floor of the automobiles. Thus, the wire harness 101 inside the protection box 201 can be protected from various the violent stresses from outside. It is also possible to protect the wire harness 101 from the effect of an electromagnetic field from outside when the protection box 201 is made of an electrically shielding material such as metal. However, it is not possible to protect the speaker lines 104 from the electromagnetic field of the power line 105, as described above. To avoid the mutual interference between the wires in the harness 101, it is necessary to shield the wires itself or use the shield wires to protect from the interference by the electromagnetic field from other lines, resulting in the large wire size and the increase of manufacturing cost.

As shown in FIG. 21, to prevent such electromagnetic effect, a split type wire spacing device 210 is proposed, such as described in the Japanese Laid-open Patent Publication No. 63-28213, published Feb. 5, 1988. The split type wire spacing device 210 has an upper unit 217A and a lower unit 217B which are made of an electrically shielding material such as metal. A plurality of spacing walls 218 are formed on the inside surface of the upper and lower units 217A and 217B so that a plurality of wire recesses 219 are formed therein. In this device 210, when one of two electrical wires 102 interferes with the other, the two wires 102 are separately placed in the different recesses 219. It is possible to prevent one wire from being interfered with the other wire without using any electric shield to the wires, because the spacing device 210 is made of an electrically shielding material. However, the wire spacing device 210 is heavy because it is made of metal. Furthermore it is difficult to form the spacing device 210 in a desired configuration, without greatly increasing the manufacturing cost.

SUMMARY OF THE INVENTION

The present invention has been developed with a view to substantially solving the above described disadvantages and has for its essential object to provide an improved wire spacing device.

In order to achieve the aforementioned objective, a wire spacing device which is used in combination with an electric wire harness having first and second wires comprises an elongated center portion extending in a first direction by a predetermined length and having first and second ends opposite to each other, a first hooking means provided on the first end for holding the first wire therein, and a second hooking means provided on the second end for holding the second wire therein, whereby the wire spacing device is located between and perpendicularly to the first and second wires such that the first and second hooking means hold the first and second wires, respectively, with a separation of said predetermined distance.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIGS. 8A, 8B, 8C are views showing a wire spacing device according to a seventh embodiment of the present invention;

FIG. 9 is a schematic perspective view showing a wire spacing device used in the wire harness, according to a eighth embodiment of the present invention;

DETAILED DESCRIPTION OF THE PREFERRED EMBODIMENTS

First Embodiment

Figure 1:
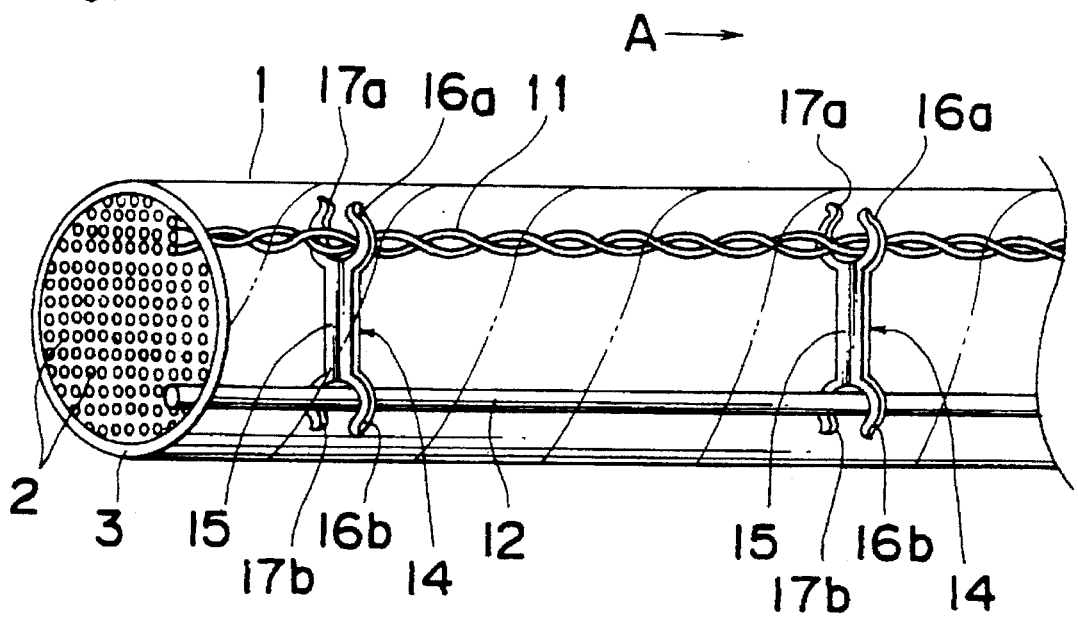
FIG. 1 is a schematic view showing a wire spacing device used in the wire harness, according to a first embodiment of the present invention.

Referring to FIG. 1, a wire spacing device according to a first embodiment of the present invention is shown. A wire spacing device 14 is installed inside a wire harness 1 to hold a low power line, such as a pair of speaker lines 11 separately from a high power line, such as a power line 12. The wire harness 1 also includes a plurality of electric wires 2 therein and is wrapped therearound by a tape 3 for tightening and fastening the wires 2. As means for tightening and fastening the wires 2, other means such as a tube, corrugated tube, and spiral tube, can be employed.

Figure 2:
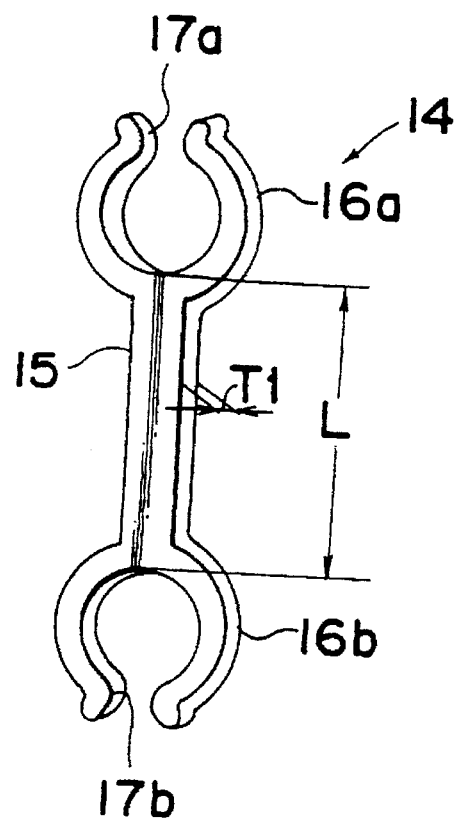
FIG. 2 is a perspective view showing the wire spacing device shown in FIG. 1.

Referring to FIG. 2, the wire spacing device 14 is shown. The wire spacing device 14 is made by an elastic material such as a polypropylene and is formed in a flat plate-like configuration having a predetermined thickness T1 defined between the opposed flat surfaces. The thickness T1 is smaller than the width of the wire spacing device 14. The wire spacing device 14 has a center bar 15 extending by a predetermined length L, and first and second hooks 16a and 16b provided at opposite ends, respectively, of the center bar 15. The center bar 15 and hooks 16a and 16b are integrally made by a resinous material such as a polypropylene and a rubber. The first hook 16a has a generally C-shaped configuration large enough to receive the wires 2, 11, and 12 therein. A distal end portion, opposite to the center bar 15, of a ring of first hook 16a is cut away to make a first pap 17a, as shown in FIG. 2. The first pap 17a has a predetermined width narrow enough not to pass even a single of wires 2, 11, and 12 therethrough. However, the first hook 16a resiliently deforms and expands the first gap 17a to pass the single wire when the wire 2, 11, and 12 is forcibly pressed in the first pap 16a. Once the wire 2, 11, and 12 passes into the first hook 16a, the first hook 16a resiliently returns to the original shape and closes the first gap 17a to a narrow configuration. Thus, the wires 2, 11, and 12 once caught in the first hook 16a are protected from an accidental removal from the first hook 16a. The open end portions of first hook 16a project in the opposed directions and are tapered outwardly, forming a guide pass for the wires 2, 11, and 12.

The second hook 16b has a construction similar to that of the first hook 16a, and has a second gap 17b at the distal end thereof. The first and second gaps 17a and 17b are substantially aligned with the center bar 15.

Referring back to FIG. 1, the wire spacing device 14 is installed in the bundle of electric wires 2, 11, and 12, each wire substantially extending in the arrow direction A. The wire spacing device 14 is located approximately perpendicularly to the direction A. A pair of speaker lines 11 is inserted in the first hook 16a through the first gap 17a and is captured therein, and the power line 12 is inserted in the second hook 16b through the second gap 17b and is captured therein. The length L of the center bar 15 is sufficiently long so that the electromagnetic field of the power line 12 does not effect the speaker lines 11 to produce noise signals. The tape 3 is firmly wound around the bundle of electric wires 2, 11, and 12 so as to maintain the wire spacing device 14 perpendicular to the electric wire bundle. Thus, the wire harness 1 is assembled.

As shown in FIG. 1, since a plurality of wire spacing device 13 are located at a suitable pitch, the speaker lines 11 and the power line 12 are separated by the predetermined length L of the center bar 15 and are prevented from coming close to each other. Therefore, the speaker lines 11 and the power line 12 are held apart by a constant distance L even when the wire harness 1 is bent. Thus, the signals through the pair of speaker lines 11 are free from the effect of the power line 12 and do not receive undesirable noise signals caused by the strong electromagnetic field generated by the strong current flowing through the power line 12. Other than the speaker line 11, the low power line may be a line carrying signals from various sensors, such a light sensor, temperature sensor, speed sensor, or the like.

Second Embodiment

Figure 3:
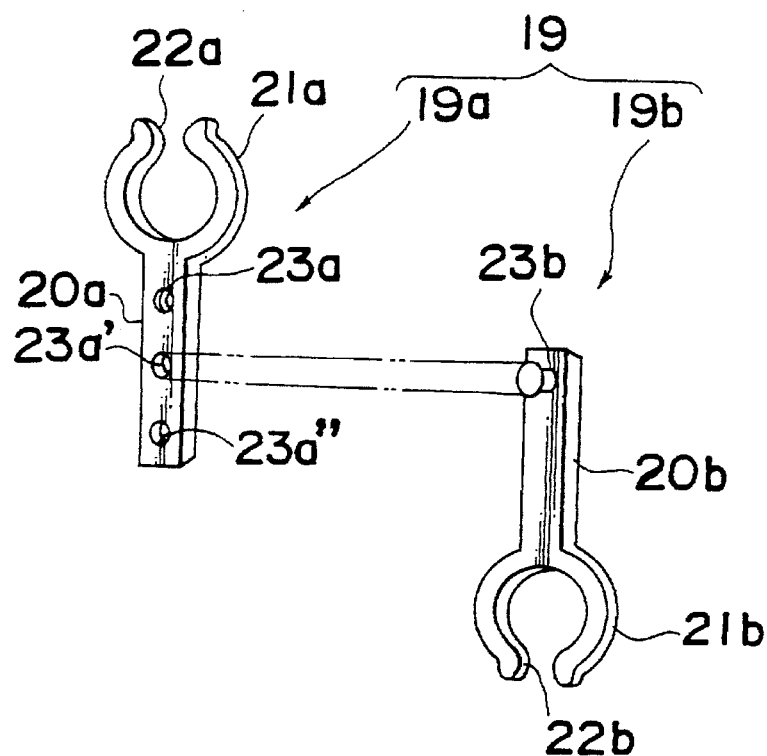
FIG. 3 is an exploded perspective view showing a wire spacing device according to a second embodiment of the present invention.

Referring to FIG. 3, a wire spacing device according to a second embodiment is shown. The wire spacing device 19 has first and second half-spacing units 19a and 19b. The first half-spacing unit 19a has a first flat bar 20a and a first hook 21a integrally connected at one end of the first bar 20a. Like in the first hook 21a are split by a first gap 22a. The first half-spacing unit 19a has a first round hole 23a for accommodating the wires therein formed in the first flat bar 20a, as shown in FIG. 3. The first half-spacing unit 19a further has second and third round holes 23a' and 23a" formed in the first flat bar 20a. The round holes 23a, 23a', and 23a" has approximately the same diameter and are located with a predetermined pitch.

The second half-spacing unit 19b has a construction similar to that of the first half-spacing unit 19a and is defined by a second flat bar 20b and a second hook 21b split by a second gap 22b. The second flat bar 20b has no round holes but has a round projection 23b provided on one of flat surfaces at a position remote from the second hook 21b. The round projection 23b has a predetermined diameter large enough to fittingly inserted into any of the round holes 23a, 23a' and 23a". Once the round projection 23b is inserted into the round hole, the first and second half-spacing units 19a and 19b are firmly connected. Thus, by selecting one of the round holes 23a, 23a', and 23a" for inserting the round projection 23b, the distance between the first and second hooks 21a and 21b can be varied, resulting in the adjustment of the distance between the electric wires held therein. It is to be noted that number, configuration, and size of round holes 23a, 23a', and 23a" can be alternatively determined according to the harness 1.

Third Embodiment

Figure 4:
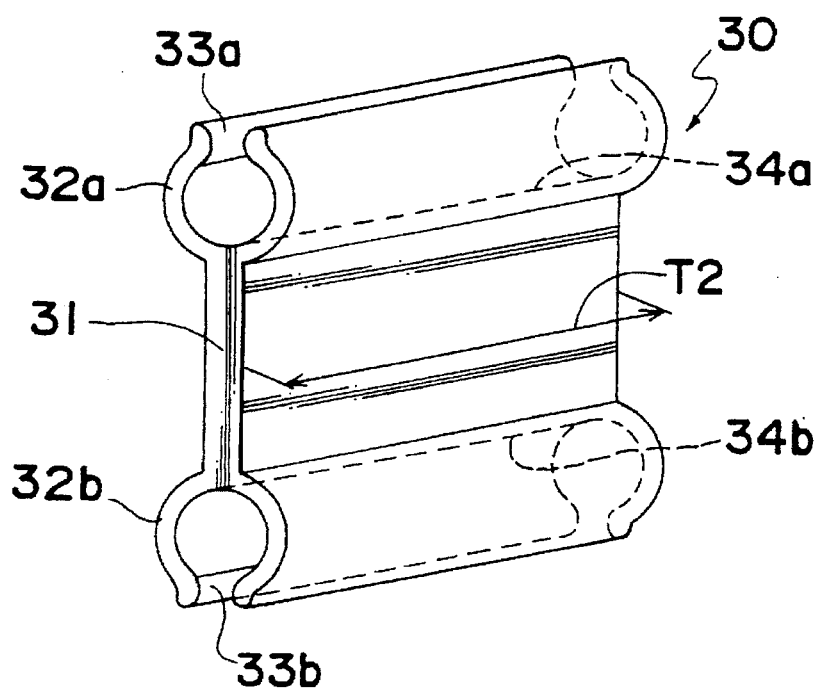
FIG. 4 is a perspective view showing a wire spacing device according to a third embodiment of the present invention.

Referring to FIG. 4, a wire spacing device according to a third embodiment is shown. The wire spacing device 30 is formed in a construction similar to that of the wire spacing device 14 of FIG. 1. The wire spacing device 30 has a thickness T2 which is greater than the thickness T1 shown in FIG. 1. Thus, a center bar 31 and first and second hooks 32a and 32b also has the thickness T2. As a result of thickness T2, a first tubular space 34a defined by inner surface of the first hook 32a is formed through the full thickness T2. A first gap channel 33a is also formed in the first hook 32. Similarly, the second hook 32b has a second tubular space 34b and second gap channel 33b.

When the harness 1 is assembled, wires are placed in the tubular spaces 34a and 34b and are supported by the inner surface of the hooks 32a and 32b through the full thickness T2. Since the pair of speaker lines 11 and the power line 12 are held apart forcibly in greater distance than that of the wire spacing device 14 of the first embodiment, the spacing between lines 11 and 12 can be further assured.

Fourth Embodiment

Figure 5:
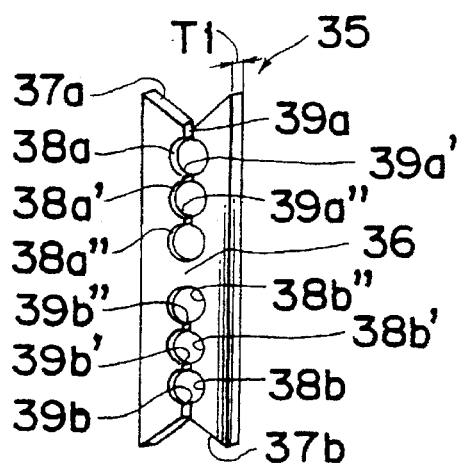
FIG. 5 is a perspective view showing a wire spacing device according to a fourth embodiment of the present invention.

Referring to FIG. 5, a wire spacing device according to a forth embodiment is shown. The wire spacing device 35 has a generally rectangular flat plate-like shape and the predetermined thickness T1. The wire spacing device 35 is formed with a first V-shaped notch 37a formed on one end portion thereof, and a second V-shaped notch 37b on the other end portion thereof.

Between the first notch 37a and a center portion 36 of the wire spacing device 35, a first through hole 38a is formed in a position near the first notch 37a, extending between the opposed flat surfaces. A second through hole 38a' is formed in a position near the first through hole 38a. A third through hole 38a" is further formed in a position near the second through hole 38a'. A first channel 39a extends between the first notch 37a and the first through hole 38a. A second channel 39a' extends between the first and second through holes 38a and 38a'. A third channel 39a" extends between the second and third through holes 38a' and 38a". The through holes 38a, 38a', and 38a" and channels 39a, 39a', and 39a" are aligned to define two arms on opposite sides of the channels.

The through holes 38a, 38a', and 38a" have substantially the same size and each has a size large enough to accommodate one or more wires therein. Since channels 39a, 39a', and 39a" are wide provided, arms on the opposite sides of the channels can be forcibly opened to pass the wires through the holes, and then the arms are returned to their initial position by its resiliency.

Similarly, between the second notch 37b and the center portion 36, through holes 38b, 38b', and 38b" and channels 39b, 39b', and 39b" are alternately formed, as shown in FIG. 5.

Since the wires 11 and 12 can be placed in any of the through holes 38a, 38a', 38a", 38b, 38b', and 38b" selectively, the distance between the speaker lines 11 and the power line 12 can be adjusted.

It is to be noted that number, configuration, and size of through holes 38a, 38a', 38a", 38b, 38b', 38b" can be alternatively determined according to the harness 1

Fifth Embodiment

Figure 6:
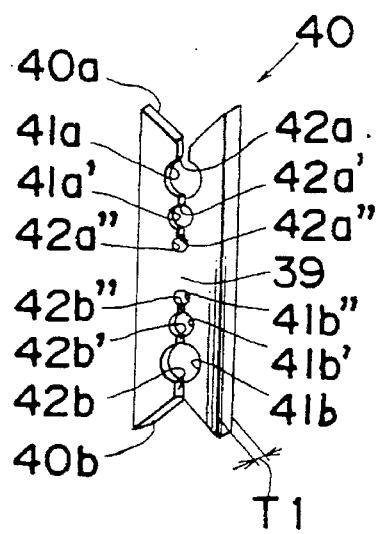
FIG. 6 is a perspective view showing a wire spacing device according to a fifth embodiment of the present invention.

Referring to FIG. 6, a wire spacing device according to a fourth embodiment is shown. The wire spacing device 40 has a construction similar to that of the wire spacing device 35. However the through holes 38a, 38a', 38a", 38b, 38b', and 38b" of the wire spacing device 35 are replaced by through holes 41a, 41a', 41a", 41b, 41b', and 41b", respectively, in the wire spacing device 40. And also, channels 39a, 39a', 39a", 39b, 39b', and 39b" are replaced by channels 42a, 42a', 42a", 42b, 42b', and 42b" in the wire spacing device 40. The center portion 36 is also replaced by a center portion 39.

The first through hole 41a has a first predetermined diameter. The second though hole 41a' has a second predetermined diameter smaller than the first predetermined diameter. The third through hole 41a" has a third predetermined diameter smaller than the second predetermined diameter. It is needless to say that the through holes 41a, 41a', 41a", 41b, 41b', and 41b" are can be formed in any other shape, suitable for accommodating the wires therein.

Since the size of the through holes 41a, 41a', and 41a" is made small toward the center portion 39, the wires having different sizes can be accommodated in the through holes 41a, 41a', 41a", 41b, 41b', and 41b", having diameters corresponding to the wire sizes. Thus, only a single piece of wire spacing device 40 can adjust plural pairs of wires having different sizes, selectively with respect to the sizes of the wires. Although the embodiment shown in FIG. 6 has a thickness T1, a wire spacing device 40 with a quarter thickness T2 can be formed.

Sixth Embodiment

Figure 7:
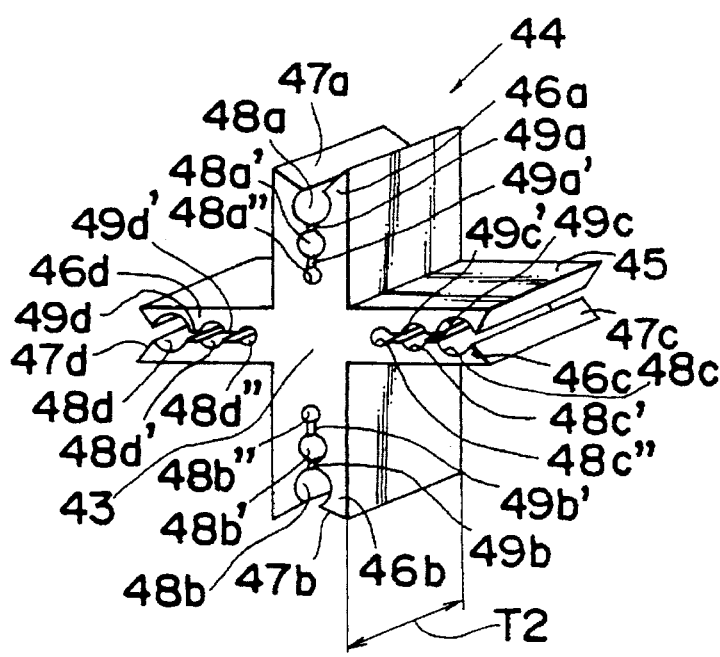
FIG. 7 is a perspective view showing a wire spacing device according to a sixth embodiment of the present invention.

Referring to FIG. 7, a wire spacing device according to a sixth embodiment is shown. The wire spacing device 44 is formed in X-shape, as if two wire spacing devices 40 cross each other. First and second half-spacing units 46a and 46b are aligned, and third and fourth half-spacing units 46c and 46d extend are aligned. The four half spacing units are angularly spaced for a right angle, as shown in FIG. 7. The first half-spacing unit 46a has a first notch 47a; first, second, and third through holes 48a, 48a', and 48a"; and first and second channels 49a, and 49a'. The first notch 47a is directly connected with the first through hole 48a. The first channel 49a connects first and second through holes 48a and 48a'. The second channel 49a' connects second and third through holes 48a' and 48a".

Similarly, the second half-spacing unit 46b has a first notch 47b; first, second, and third through holes 48b, 48b', and 48b"; and first and second channels 49b, and 49b'. The third half-spacing unit 46c has a first notch 47c; first, second, and third through holes 48c, 48c', and 48c"; and first and second channels 49c, and 49c'. The fourth half-spacing unit 46d has a first notch 47d; first, second, and third through holes 48d, 48d', and 48d"; and first and second channels 49d, and 49d'.

And also, the wire spacing device 44 is extended by the predetermined length T2 in a manner similar to that of the wire spacing device 30. When the wire harness 1 is made, plural number of wires 2 are bundled around the wire spacing device 44 and aligned in a direction in the device 44 is extended, enabling to form a round cross-sectional shape of the wire bundle. Since the spacing device 44 has a greater thickness T2, the wire harness 1 made by wrapping the tape 3 around bundled wires 2 can be securedly kept in a round cross-sectional shape. Furthermore, the tape 3 can be wound around the wire bundles 2 without tilting the wire spacing device 44 with respect to the direction in which the wire harness 1 extends.

Seventh Embodiment

Figure 8A:
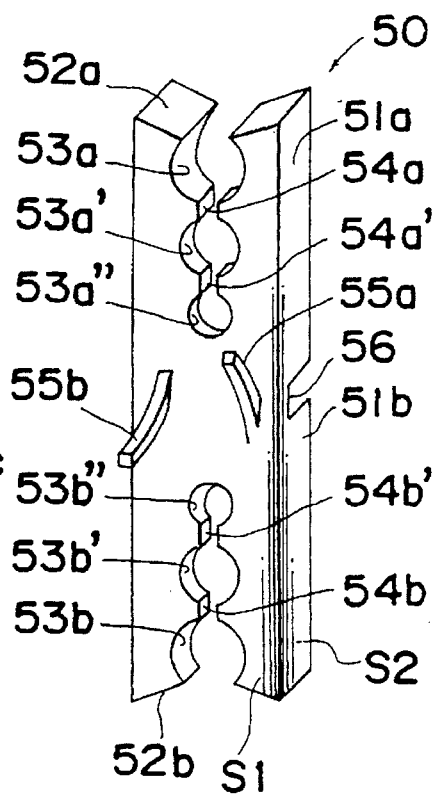

Referring to FIGS. 8A, 8B, and 8C, a wire spacing device according to a seventh embodiment is shown. The wire spacing device 50 has a construction similar to that of the wire spacing device 40, but is formed with a square groove caved horizontally in the center portion of backside S2 thereof, as best shown in FIG. 8 so that the wire spacing device 50 is divided in two units, first and second half units 51a and 51b. This square groove forms a hinge portion 56 between first and second half units 51a and 51b so that the half units 51a and 51b can pivot about the hinge portion 56 to hold the units 51a and 51b with the close face side S1 inside, as best shown in FIG. 8C. It is also possible to fold the half units 51a and 51b in opposite direction until the neighboring corner edges of the half units 51a and 51b contact.

As shown in FIG. 8A, in the first half unit 51a, the through holes 53a, 53a', and 53a", the channels 54a and 54a' are formed. In the second half unit 51b, the through holes 53b, 53b', and 53b", the channels 54b and 54b' are formed. On the front side surface S1 of the second half unit 51b, a first elastic bar 55a is provided in a position proximal to the hinge portion 56 and the right side edge thereof. The first elastic bar 55a is arced with a large curvature and upwardly extends so as to depart from the front side surface S1, as shown in FIG. 8B.

On the front side surface S1 of the first half unit 51a, a second elastic bar 55b is provided in a position proximal to the hinge portion 56 and the left side edge thereof. The second elastic bar 55b is arced with a large curvature and downwardly extend so as to depart from the front side surface S1, as shown in FIG. 8B.

When is viewed from the side, the first and second elastic bars 55a and 55b cross each other adjacent the hinge portion 56, as shown in FIG. 8B. When the first and second half units 51a and 51b are but at the hinge portion 56, the first and second elastic bars 55a and 55b contact with the half units 51a and 51b, respectively. Since the first and second elastic bars 55a and 55b are made by an elastic material, the elastic bars 55a and 55b bend resiliently to a predetermined degree but will be not bent more than the predetermined degree with respect to the external force applied thereto. Therefore, the first and second half units 51a and 51b are stopped by the elastic bars 55a and 55b at a certain position to keep apart by a distance Lb, as shown in FIG. 8C. Thus, the distance between the through holes in the first half unit 51a and the second half unit 51b varies linearly from the maximum shown in FIG. 8B to the minimum shown in FIG. 8C. For example, when the wires are accommodated in the first through holes 53a and 53b, the distance between the wires can be varied from the distance Le shown in FIG. 8B to the distance Lb shown in FIG. 8C.

Eighth Embodiment

Figure 10:
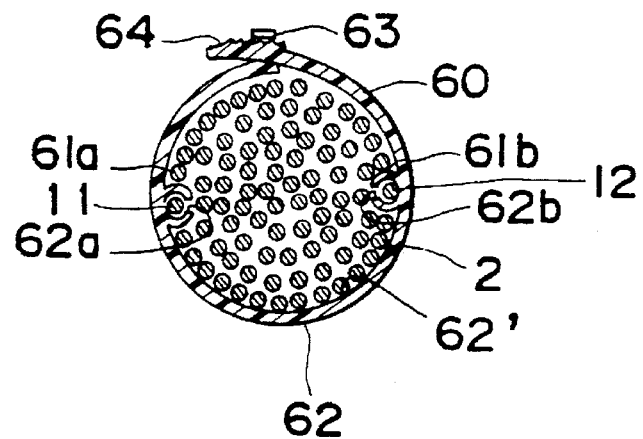
FIG. 10 is a cross-sectional view taken along a line X—X shown in FIG. 9.

Referring to FIGS. 9 and 10, a wire spacing device according to an eighth embodiment is shown. As shown in FIG. 9, a wire harness 1" is assembled such that a plurality of the wire spacing device 60 having a belt-like configuration are wounded around the wire bundles at a certain pitch to tighten the wires 2. As shown in FIG. 10, the wire spacing device 60 has an outer surface 62 and an inner surface 62', to which the wires contact when the device 60 is wound around the wire bundle 2. On the opposite end portions of the outer surface. 62, a buckle 63 and a number of serration 64 are formed. The serration 64 engages with the buckle 63 to fasten the wire spacing device 60 and to keep the wire bundle 2 tightened.

The wire spacing device 60 is provided with a first hook 61a integrally formed on the inner surface 62'. The first hook 61a has a generally C-shape with a first gap 62a opened at the position opposed to the portion of the device 60 at which the first hook 61a is connected. The first hook 62a is large enough to accommodate al least one wire 2 therein. The first gap 62a is wide enough to forcibly pass one wire at a time. The wire spacing device 60 is further provided with a second hook 61b having a construction similar to that of the first hook 61a. The first hook 61a is positioned with a suitable pitch and so are the second hook 61b. The hooks 61a and 61b are preferably located on the opposite sides of a diameter of the bundle to keep a predetermined distance therebetween when the device 60 is wound around the wire bundle 2.

When the harness 1" is assembled, for example, the speaker lines 11 are inserted in the first hook 61a passing through the first gap 62a and are accommodated therein. The power line 12 is inserted in the second hook 61b passing through the second gap 62b and is accommodated therein. Thus, the speaker lines 11 and power line 12 are separated by the first and second hooks 61a and 61b at the predetermined distance. Since the wire spacing device 60 has means for spacing, tightening, and fastening the wires 2 integrally formed therewith, the number of components required for assembling the wire harness can be reduced.

Ninth Embodiment

Figure 11:
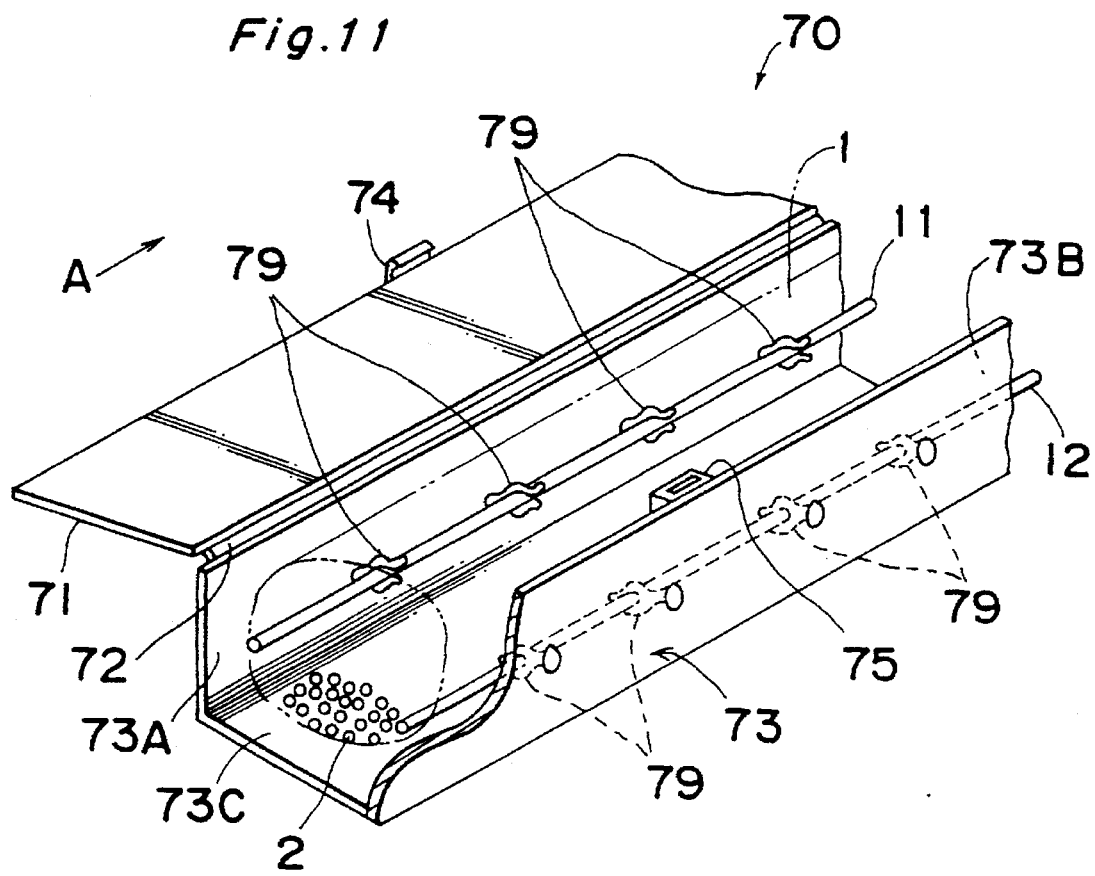
FIG. 11 is a schematic perspective view showing a wire spacing device, according to a ninth embodiment of the present invention.

Referring to FIG. 11, a wire spacing device according to a ninth embodiment of the present invention is shown. A wire spacing device 70 has a rectangular chamber 73 opened at opposite ends. The wire spacing device 70 has a top lid 71 for closing the top opening of the rectangular chamber 73. The rectangular chamber 73 is formed in a rectangular tube-like configuration extending in the arrow direction A. The rectangular chamber 73 has a bottom side wall 73C, a back side wall 73A connected to one side edge of the bottom side wall 73C, and a front side wall 73B connected to the other side edge of the bottom side wall 73C. The back and front side walls 73A and 73B are opposed to each other. A locking block 75 is provided at the middle of upper edge of the front side wall 73B. A locking tab 74 is provided at the middle of free side edge of the lid 71.

Along the upper edge of the back side wall 73A, a hinge portion 72 is provided. One side edge of the top lid 71 is connected with hinge portion 72 and is further connected with the back side wall 73A so that the top lid 71 can pivot about the hinge portion 72 to close the top opening. At the same time, the locking tab 74 and the locking block 75 are also engaged to lock the top lid 71 at the position to protect the wire harness inside the device 70 from the stress coming from the outside.

Figure 12:
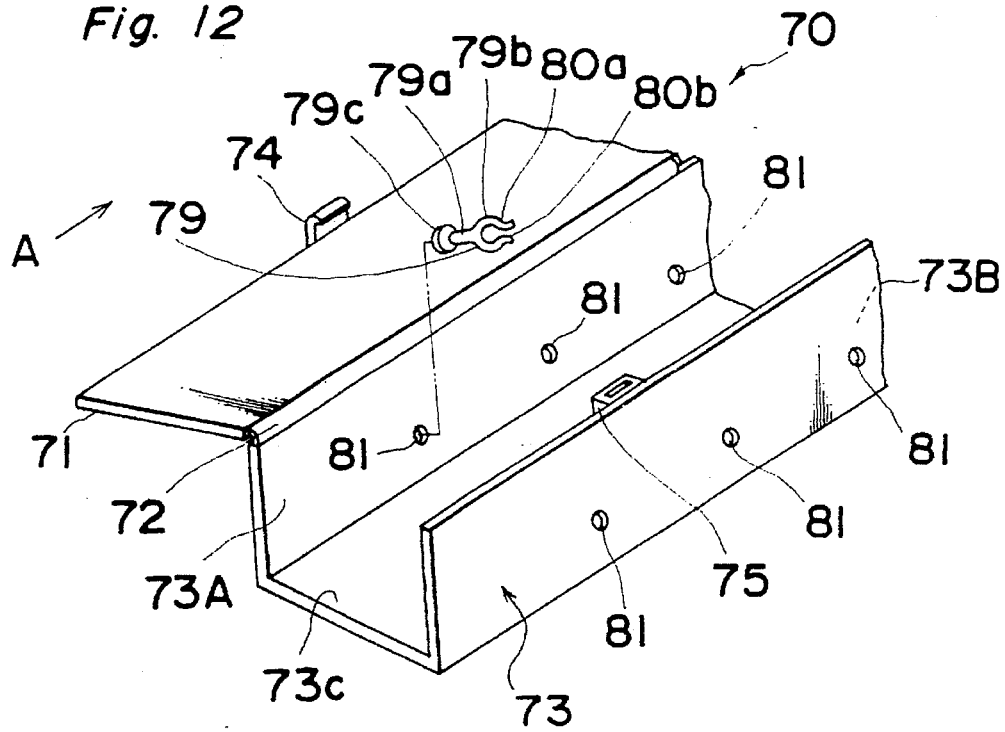
FIG. 12 is a perspective exploded view showing a tubular chamber and a hook unit of the wire spacing device shown in FIG. 11.

Referring to FIG. 12, the rectangular chamber 73 and a plurality of hook units 79 are shown. At the middle of the inside surface of the back side wall 73A, a plurality of mounting holes 81 are formed at the same horizontal height with a predetermined pitch. The mounting hole 81 is preferably formed in a round shape having a predetermined diameter, and also can be formed in any other suitable shape. Similarly, a plurality of mounting holes 81 are also formed in the front side wall 73B.

The hook unit 79, made of elastic material, has a stem portion 79a, a hooking portion 79b integrally connected to one end of the stem portion 79a, and a hemispherical projection 79c integrally connected to the other end of the stem portion 79c. The hooking portion 79b has a construction similar to that of the first hook 16a of the first embodiment, and has two arced clipping claws 80a and a clipping gap 80b between ends of two claws 80a. Thus, the hooking portion 79b can accommodate a wire 2 forcibly passed through the clipping gap 80b by clipping the wire 2 elastically. The hemispherical projection 79c preferably has a predetermined diameter large enough to be fittingly inserted in the mounting holes 81. Therefore, the hook units 79 can be installed on the inner surface of the back side wall 73A by inserting the hemispherical projection 79c in the mounting holes 81. Similarly, the hook units 79 are installed in the front side wall 73B.

As best shown in FIG. 11, when the rectangular chamber 73 is viewed from the left side end in the direction A, all of hook units 79 are aligned to define one horizontal wire holding means on the each of inner surfaces of the side walls 73A and 73B. Thus, the speaker lines 11 and the power line 12 can be separately held by the two rows of hook units 79 at a predetermined distance, which is about the same as the inner width of the tubular chamber 73. Therefore, the pair of speaker lines 11 is insulated from the effect of the power line 12 and does not receive undesirable noise signals caused by the strong electromagnetic field Generated by the strong current flowing through the power line 12. When the pair of speaker lines 11 is replaced by a signal line for carrying sensor signals, the signal line is well protected from the noise signal caused by the power line 12, preventing the driving of the sensor circuit in error.

Tenth Embodiment

Figure 13:
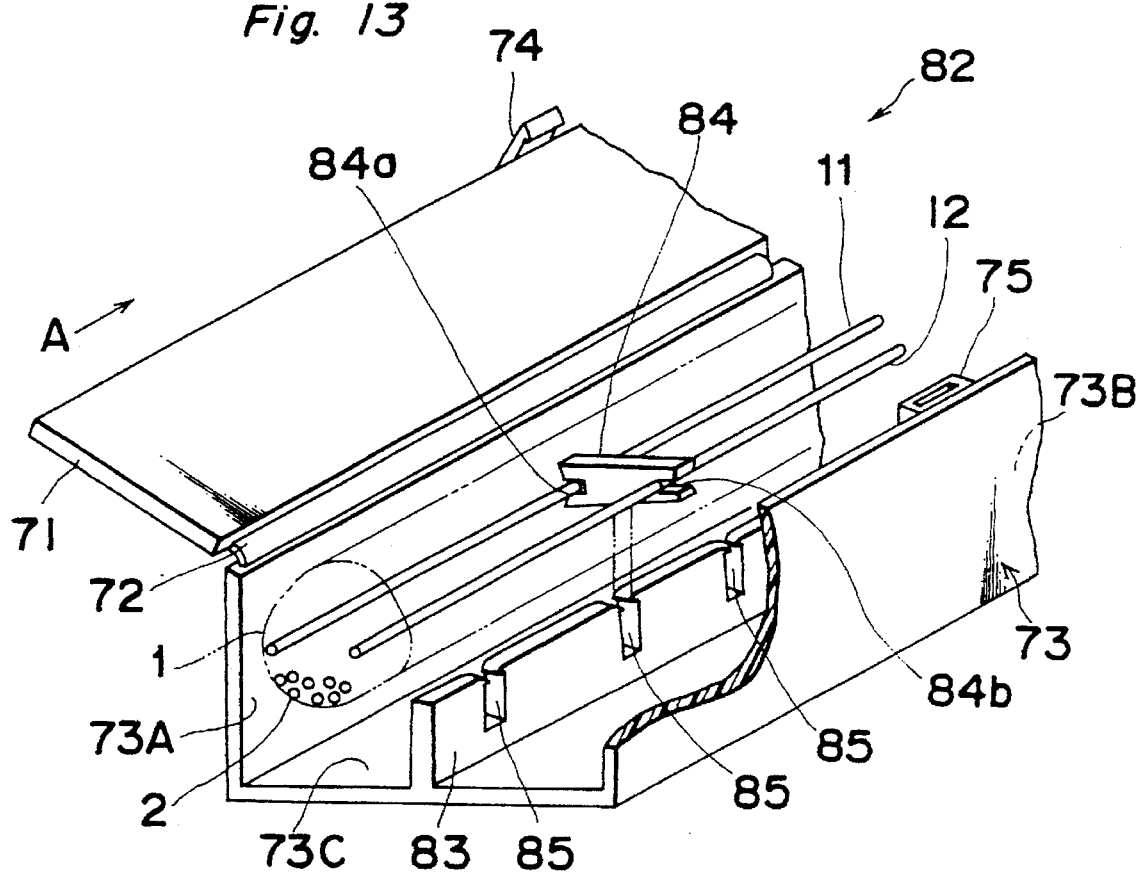
FIG. 13 is a schematic perspective view showing a wire spacing device, according to a tenth embodiment of the present invention.
Figure 14:
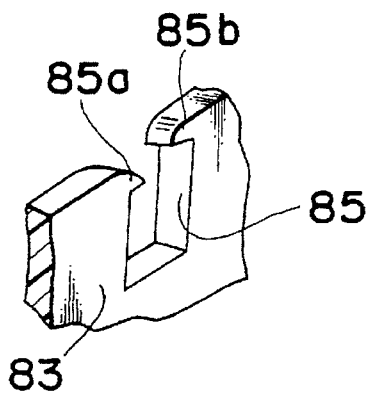
FIG. 14 is an enlarged perspective view of a portion including a slit of the wire spacing device shown in FIG. 13.
Figure 15:
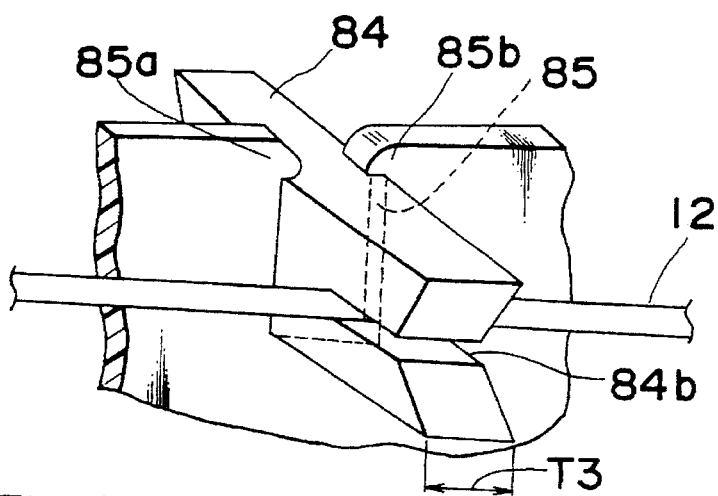
FIG. 15 is an enlarged perspective view of a portion in which a wire support unit is installed in the slit of the wire spacing device shown in FIG. 13.

Referring to FIGS. 13, 14, and 15, a wire spacing device according to a tenth embodiment of the present invention is shown. A wire spacing device 82 has a construction similar to that of the wire spacing device 70. However, when compared with the wire spacing device 70, the mounting holes 81 are removed from the tubular chamber 73, but a center ridge 83 is additionally provided at the center portion of the bottom wall 73C, extending in the arrow direction A. The hook unit 79 is replaced by a wire support unit 84, made of elastic material, for supporting two different wires separately at a predetermined distance, as best shown in FIG. 13.

The support unit 84 is formed generally in a flat rectangular plate-like shape having two opposite short sides and two opposite long sides, and having a predetermined thickness T3 (FIG. 15). One of short sides of the hook unit 79 is cut away in a V shape and tapered toward the inside. At the center of the tapered short side, a groove extends parallel to the long sides by a predetermined length. The groove has a width narrow enough to elastically hold the wire which is forcibly passed therein. Thus, a first wire recess 84a is formed in one of short sides of the support unit 84 for supporting the wire therein. Similarly, a second wire recess 84b is formed in another short side to oppose to the first wire recess 84a. The clearance between wire recesses 84a and 84b are determined so as to suppress the effect of the strong electromagnetic field of the power line from the other lines.

The center ridge 83 also extends vertically by a predetermined length. A plurality of slits 85 are formed in the top edge portion of the center ridge 83 with a predetermined pitch. The slit 85 vertically extends toward the bottom wall 73C by a predetermined length such that the slit 85 is formed in a rectangular shaped configuration approximately the same as the cross-sectional configuration of the support unit 84. On the upper end portion of the slit 85, a first claw 85a having a quarter-circle shape defined by a round upper side and a flat lower side is provided on one vertical side surface thereof. Similarly a second claw 85b is provided on the other vertical side surface thereof. The first and second claws 85a and 85b horizontally extends in the opposite directions by a predetermined length to keep a predetermined clearance therebetween, such that the first and second claws 85a and 85b can elastically deform and widen the clearance therebetween enough to pass the support unit 84 into the slit 85 when the support unit 84 is pressed against the round upper surfaces thereof. Once the support unit 84 is inserted in the slit 85, the claws 85a and 85b elastically returns to the original position and firmly hold the support unit 85 by the flat lower sides thereof, as best shown in FIG. 15. Thus, the support unit 84 once installed in the slits 85 are protected from removal from the slits 85 accidentally.

When is viewed the wire spacing device 82 with the support units 85 held in the slits 85 from the left side end in the direction A, all of first wire recesses 84a are aligned to define a first wire recessing means on the left side of the support unit 84, and all of second wire recesses 84b are aligned to define a second wire recessing means on the right side of the support unit 84. By holding the speaker lines 11 and the power line 12 in the first and second wire recessing means, respectively, as shown in FIG. 13, the speaker lines 11 are well insulated from the electromagnetic field from the power line 12 and does not receive undesirable noise signals.

Eleventh Embodiment

Figure 16:
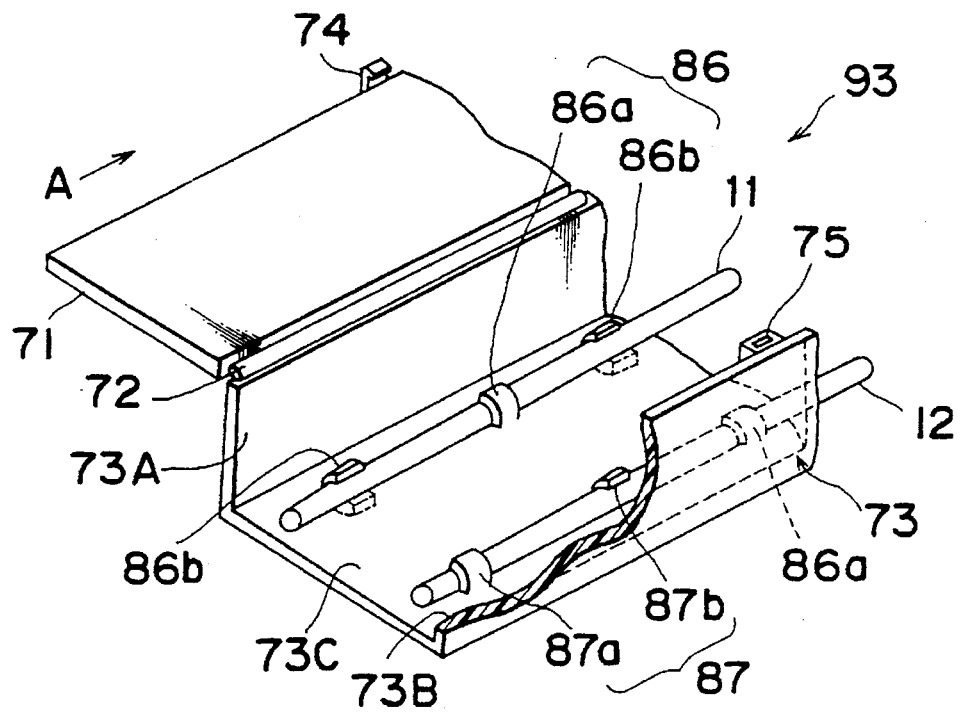
FIG. 16 is a schematic perspective view showing a wire spacing device, according to an eleventh embodiment of the present invention.

Referring to FIG. 16, a wire spacing device according to an eleventh embodiment of the present invention is shown. A wire spacing device 93 has a construction similar to that of the wire spacing device 70. However, when compared with the wire spacing device 93, the mounting holes 81 are removed from the front and back side walls 73A and 73B. However, the bottom wall 73C is additionally formed with a plurality of first, second, third, and fourth arced clips 86a, 86b, 87a, and 87b which are arranged in two rows, extending in the arrow direction A parallel to each other.

The fist arced clip 86a is formed by the bottom side wall 73C at left side portion thereof proximal to the back side wall 73A and extending toward the back side wall 73A in a direction perpendicular to the arrow direction A. As best shown in FIG. 16, the first arced clip 86a is in generally a quarter ring like configuration having a free end portion and a fixed end portion which is integrally connected to the bottom wall 73C at a position remote from the back side wall 73A. By the free end portion, the first arched clip 86a is raised up to form generally a quarter circle like space which is opened to the back side wall 73A between the first arched clip 86a and the bottom wall 73C, such that the speaker line 11 and power line 12 fit on the thus formed quarter circle-like space.

Similarly, the second arced clip 86b is formed on the bottom wall 73C but is opened to the front side wall 73B, opposing to the first arced clip 86a. The third arched clip 87a has a construction similar to the second arced clip 86b but is located at right side portion thereof proximal to the front side wall 73B. The fourth arched clip 87b has a construction similar to the first arced clip 86a but is located at right side portion thereof proximal to the front side wall 73B.

When is viewed the wire spacing device 93 with the arced clips 86a, 86b, 87a, and 87b from the left side end in the direction A, all of first and second arced clips 86a and 86b are aligned to define a first wire clipping space in the left side portion on the bottom wall 73C. Similarly, all of third and fourth arched clips 87a and 87b are aligned to define a second wire clipping space in the right side portion on the bottom wall 73C. The speaker lines 11 and the power line 12 are separately held in the first and second wire clipping spaces, respectively, as shown in FIG. 16, protecting the speaker lines from the effect of strong electromagnetic field from the power line 12.

Twelfth Embodiment

Figure 17:
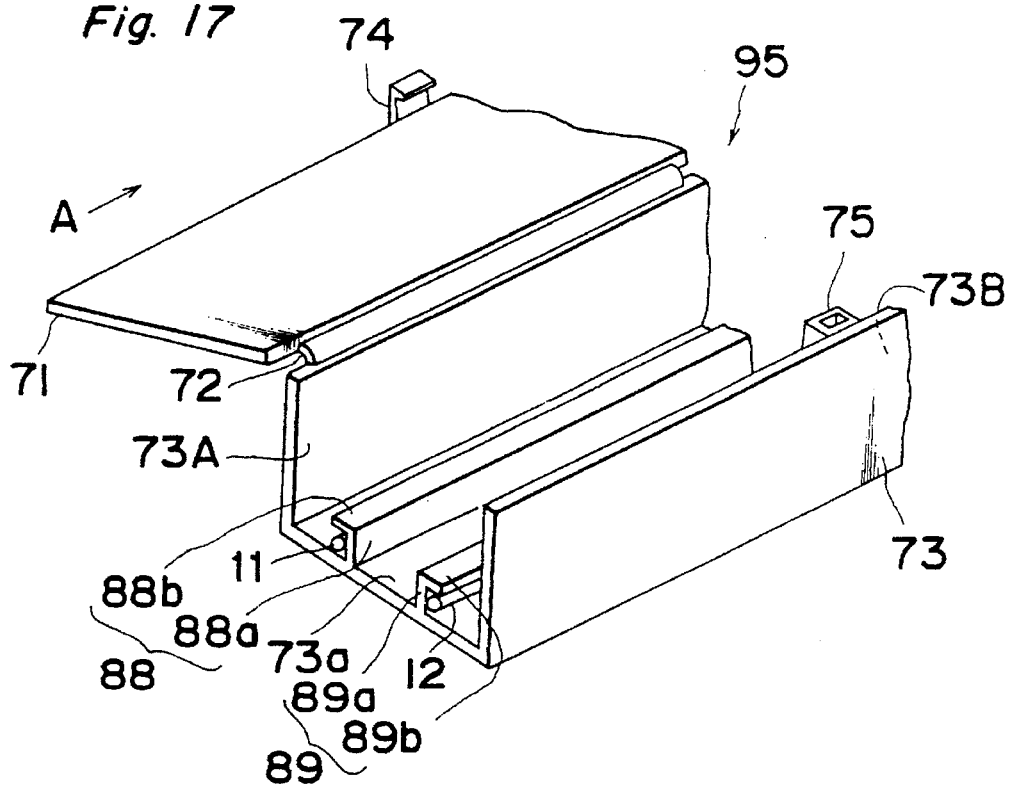
FIG. 17 is a schematic perspective view showing a wire spacing device, according to a twelfth embodiment of the present invention.

Referring to FIG. 17, a wire spacing device according to a twelfth embodiment of the present invention is shown. A wire spacing device 95 has a construction similar to that of the wire spacing device 93. However, when compared with the wire spacing device 93, a plurality of first, second, third, and fourth arced clips 86a, 86b, 87a, and 87b are replaced by first and second frames 88 and 89 formed on the bottom wall 73C, extending in the arrow direction A.

The first frame 88 is provided on the left side portion of the bottom wall 73C proximal to the back side wall 73A. The first frame 88 has a first vertical portion 88a extending upwardly from the bottom wall 73C and a first horizontal portion 88b integrally connected with the first vertical portion 88a at the right side edge thereof and is in a reversed L shape. Thus, a first tubular space opening to the front side wall 73B is defined by the first horizontal portion 88a, the first vertical portion 88b, and the bottom wall 73C. The first tubular space is so configured as to receive and hold the speaker line 11 and the power line 12 therein.

Similarly, the second frame 89 has a second vertical portion 89a and a second horizontal portion 89b and is provided on the right side such that the second tubular space are opened to the front side wall 73B. The first and second frames 88 and 89 extending in the arrow direction, parallel to each other with a predetermined distance therebetween. This distance is determined in consideration of the strength of electromagnetic field caused by the power lines 12 and the sensitiveness of the signal lines 11.

The speaker lines 11 and the power line 12 are separately held in the first and second tubular spaces, respectively, as shown in FIG. 16, protecting the speaker lines from the effect of strong electromagnetic field from the power line 12. It is needless to say that the first and second frames 88 and 89

Thirteenth Embodiment

Figure 18:
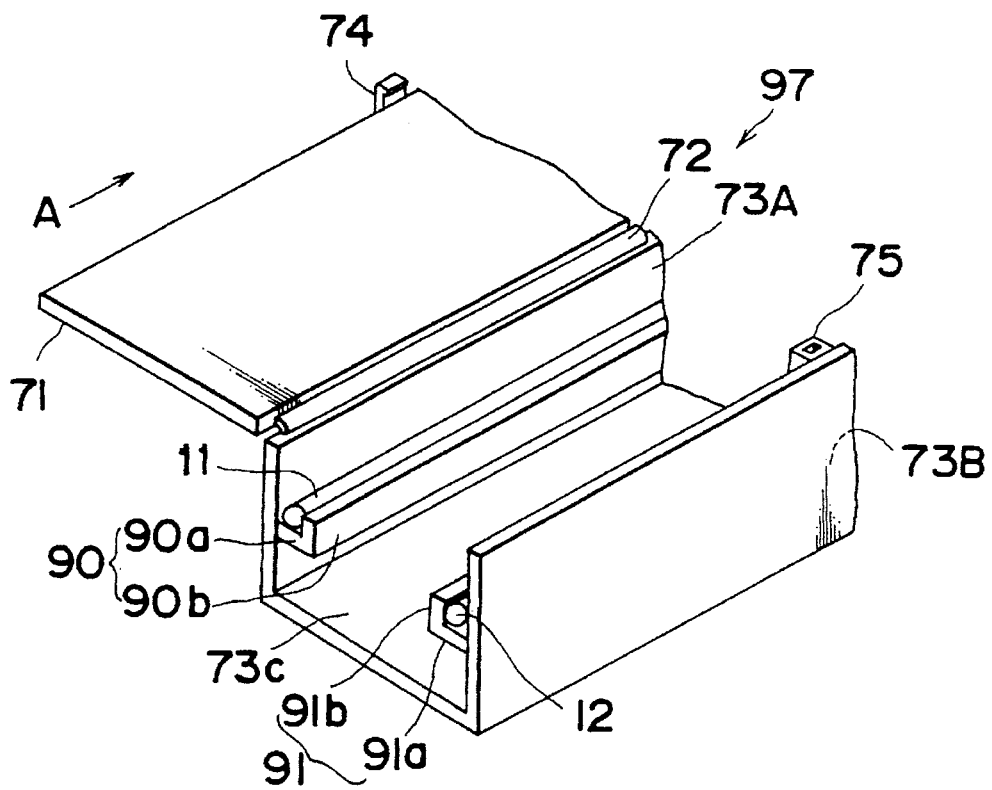
FIG. 18 is a schematic perspective view showing a wire spacing device, according to a thirteenth embodiment of the present invention.
Figure 19:
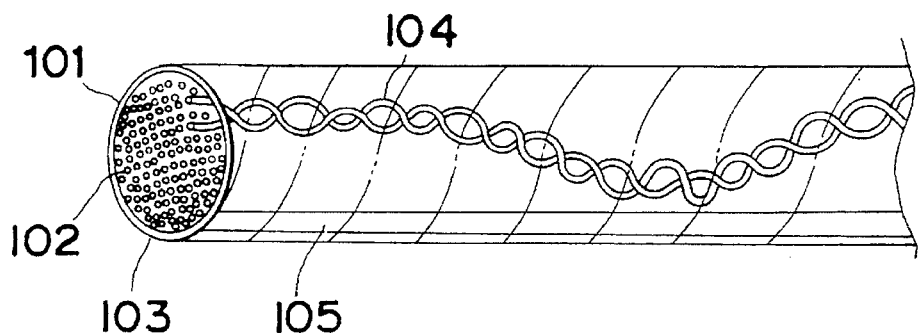
FIG. 19 is a schematic perspective view showing the conventional wire harness.
Figure 20:
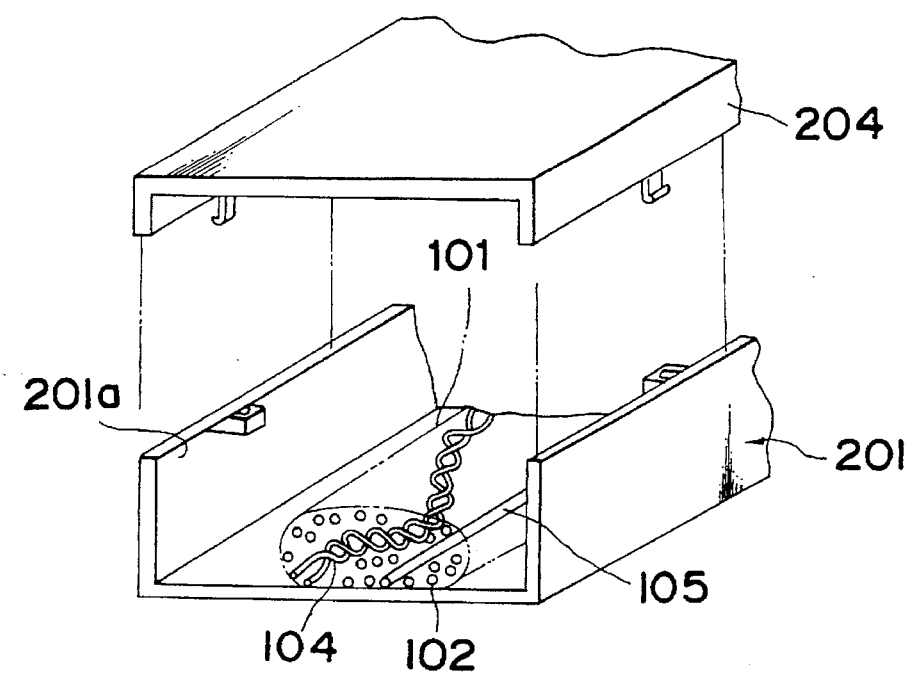
FIG. 20 is a schematic perspective view showing a conventional wire spacing device.
Figure 21:
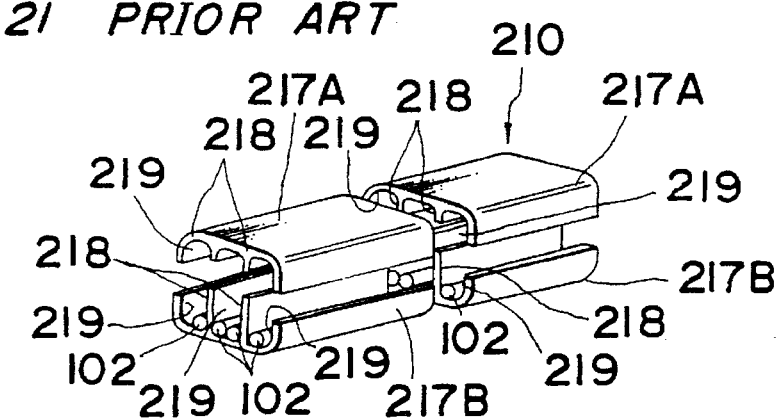
FIG. 21 is a schematic perspective view showing another conventional wire spacing device.

Referring to FIG. 18, a wire spacing device according to a thirteenth embodiment of the present invention is shown. A wire spacing device 97 has a construction similar to that of the wire spacing device 95. However, when compared with the wire spacing device 95, he first and second frames 88 and 89 are removed from the bottom wall 73C, and third and fourth frames 90 and 91 formed on the back and front side walls 73A and 73B, respectively.

The third frame 90 has a configuration similar to that of the first frame 89a and has a third horizontal portion 90a which is provided in the middle of the back side wall 73A, extending horizontally toward the front side wall 73B. A third vertical portion 90b is integrally connected with the third horizontal portion 90a at the right side edge thereof and is in a reversed L shape. Thus, a third tubular space opened to the top side is defined by the third horizontal portion 90a, the third vertical portion 90b, and the back side wall 73A. The third tubular space is so configured as to receive and hold the speaker line 11 and the power line 12 therein.

Similarly, the fourth frame 91 has a fourth horizontal portion 91a and a fourth vertical portion 91b and is provided in the middle of the front side wall 73B such that the fourth tubular space is opened to the top side.

The speaker lines 11 and the power line 12 are separately held in thus the third and fourth tubular spaces, respectively, as shown in FIG. 17, protecting the speaker lines from the effect of strong electromagnetic field from the power line 12. In this embodiment, since the third and fourth frames 90 and 91 are provided on the back side wall 73A and the front side wall 73B, respectively, the speaker lines 11 can be insulated from the power lines 12 by a maximum distance almost the same as width of the bottom wall 73C.

As is clear from the above, since it is not necessary to shield the wires itself, use the shield wires to protect from the interference by the electromagnetic field from other lines, the wire harness 1 can be assembled small and the manufacturing cost can be reduced. Furthermore, it is not necessary to make the tubular chamber by a shielding material, such as metal, resulting in the reduction of the weight of the device.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A wire spacing device in combination with an electric wire harness, said electric wire harness comprising a first electric wire for transmitting a first signal having a first power, a second electric wire for transmitting a second signal having a second power which is higher than said first power and which generates an electromagnetic field, and a plurality of additional electric wires, said wire spacing device comprising:

a housing means having a first wall, a second wall connected with and perpendicular to said first wall, and a third wall connected with and perpendicular to said first wall so as to oppose said second wall with a predetermined clearance therebetween for accommodating said wire harness therein, said first, second and third walls extending in a first direction;

a first hold means provided on said second wall for holding said first electric wire; and a second hold means provided on said third wall for holding said second electric wire, whereby when said wire harness is accommodated in said wire spacing device, said first and second electric wires are held by said first and second hold means, respectively, and are separated by a predetermined distance, thereby to protect said first electric wire from the electromagnetic field of said second electric wire.

2. The combination as claimed in claim 1, wherein said first hold means comprises a plurality of first hold means, each including:

a first engaging means provided on said second wall and aligned in said first direction;

a first hooking means for holding said first electric wire; and a second engaging means engageable with said first engaging means connected to said first hooking means; and said second hold means comprising a plurality of second hold means, each comprising:

a third engaging means provided on said third wall and aligned in said first direction;

a second hooking means for holding said second electric wire; and a fourth engaging means engageable with said third engaging means connected to said second hooking means.

3. A wire spacing device in combination with an electric wire harness, said electric wire harness comprising a first electric wire for transmitting a first signal having a first power, a second electric wire for transmitting a second signal having a second power which is higher than said first power and which generates an electromagnetic field, and a plurality of additional electric wires, said wire spacing device comprising:
- a housing means having a first wall, a second wall connected with and perpendicular to said first wall, and a third wall connected with and perpendicular to said first wall so as to oppose said second wall with a predetermined clearance therebetween for accommodating said wire harness therein;
- a wire holding means having first and second sides for holding said first and second electric wires separated by a predetermined distance, comprising:
- a first hold means provided on said first side for holding said first electric wire;
- a second hold means for holding said second electric wire provided on said second side; and
- a first engaging means provided between said first and second hold means; and
- a second engaging means engageable with said first engaging means and provided on said first wall, whereby said wire harness is accommodated in said wire spacing device, said first and second electric wires are held by said first and second hold means of said wire holding means, respectively, while said first engaging means is engaged with said second engaging means, thereby to protect said first electric wire from the electromagnetic field of said second electric wire.

* * * * *